Figure 1:
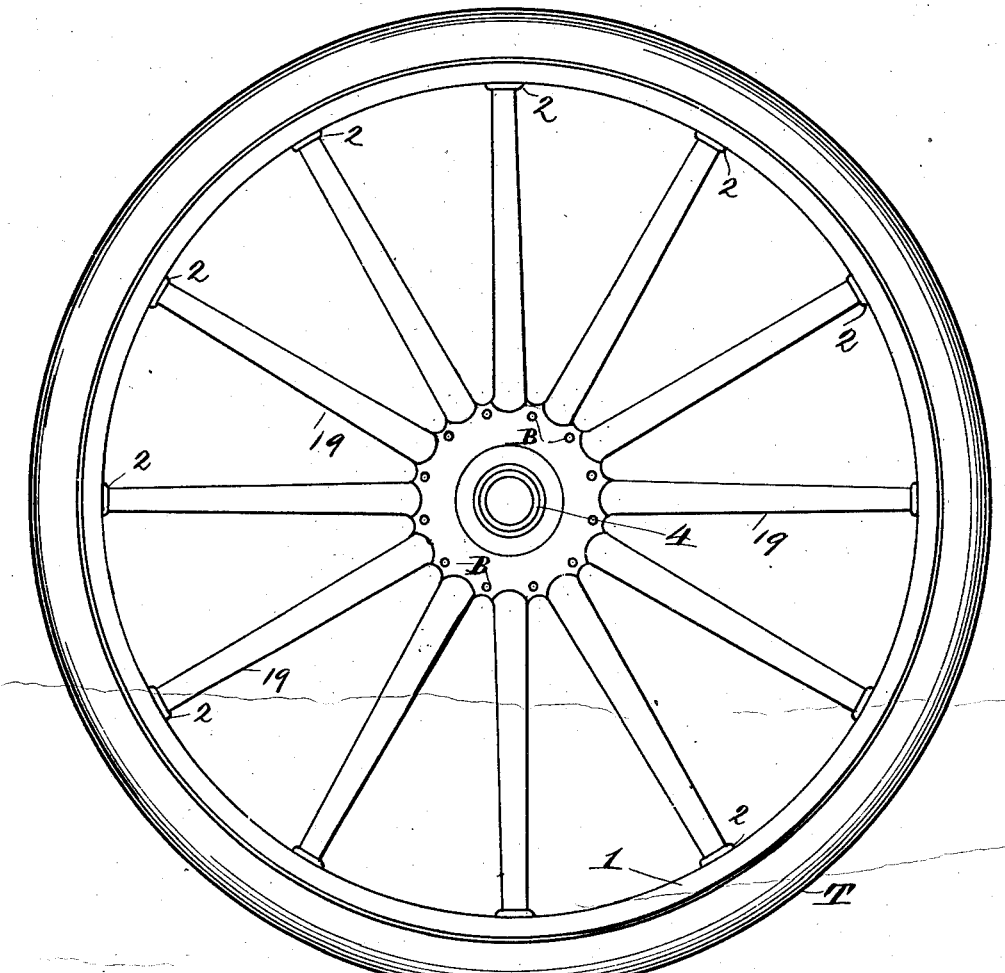

P. WILKES.
ADJUSTABLE ELASTIC AUTOMOBILE WHEEL.
APPLICATION FILED MAR. 20, 1909.

1,044,324.

Patented Nov. 12, 1912.

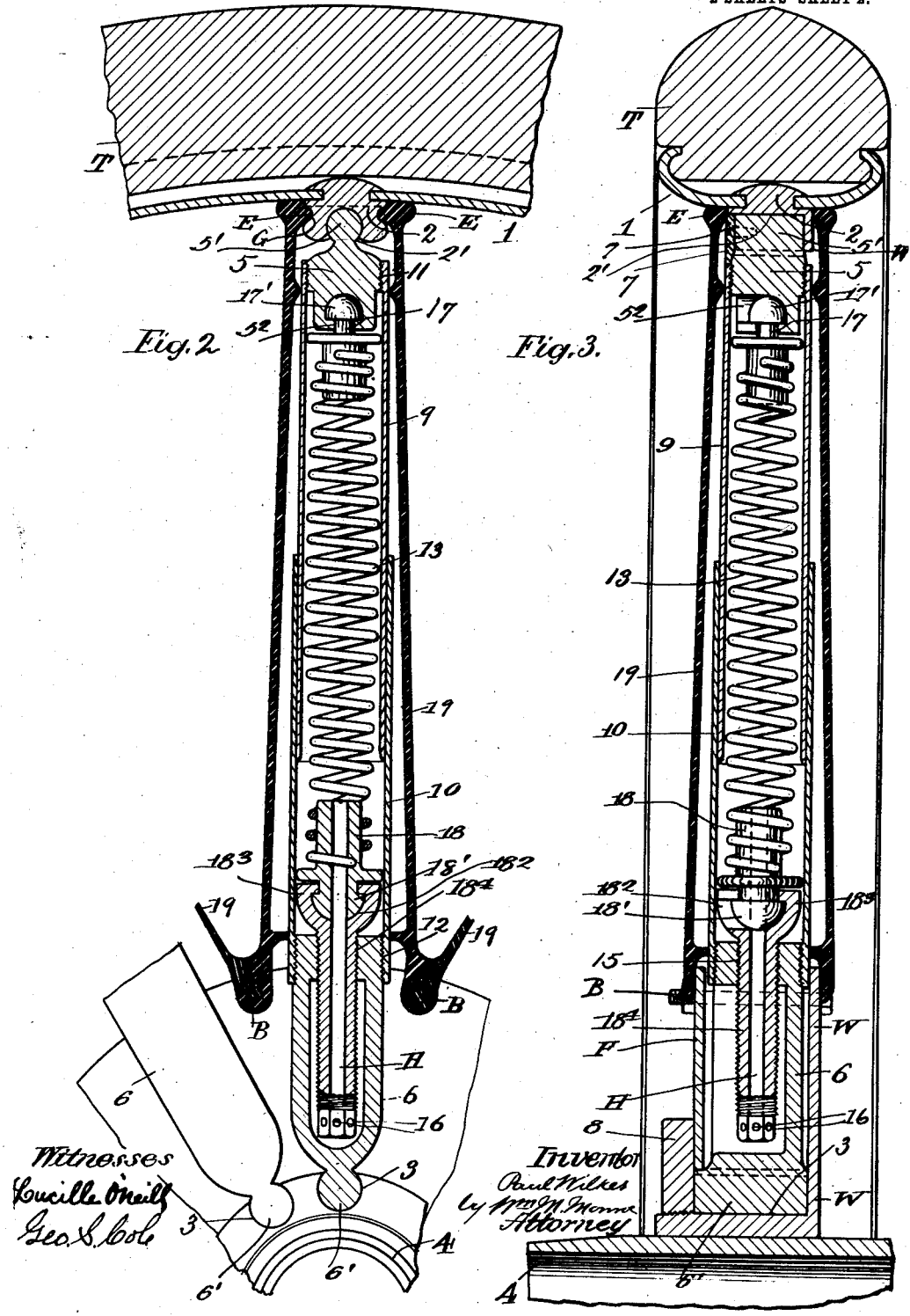

UNITED STATES PATENT OFFICE.

PAUL WILKES, OF CLEVELAND, OHIO, ASSIGNOR OF ONE-THIRD TO HUBER R. BRADY AND ONE-THIRD TO JOHN A. HOOVER, BOTH OF CLEVELAND, OHIO.

ADJUSTABLE ELASTIC AUTOMOBILE-WHEEL.

1,044,324.  Specification of Letters Patent.  Patented Nov. 12, 1912.

Application filed March 20, 1909. Serial No. 484,823.

*To all whom it may concern:*

Be it known that I, PAUL WILKES, a citizen of the United States, and resident of Cleveland, in the county of Cuyahoga and State of Ohio, have invented certain new and useful Improvements in Adjustable Elastic Automobile-Wheels, of which I hereby declare the following to be a full, clear, and exact description, such as will enable others skilled in the art to which it appertains to make and use the same.

The general objects of the invention are to obtain the desired resiliency in an automobile wheel by means of resilient spokes in lieu of a pneumatic tire, and hence to avoid the disadvantages found in the use of the pneumatic tire such as want of durability under internal pressure, and great liability to injury since pneumatic tires are easily punctured or blown up. With this improved form of construction the tire can be made of hard rubber or in any ordinary manner, and the elasticity of the wheel will be unaffected.

Other objects of the invention are to provide a longitudinally collapsible and resilient wheel spoke, which will still retain its lateral rigidity unimpaired but which will be free to move slightly in the hub and rim, so that when standing horizontally in the wheel the extremities of the horizontal spokes can yield a little, to permit of the compression of the lower vertical spokes and elongation of the upper vertical spokes due to the weight of the vehicle, which rests upon them in turn.

Further objects are to provide means for permitting the escape of air from the spokes as they are shortened, for excluding dust from the moving parts of the spoke, and to permit of adjustment and removal of the various parts to permit of repairs being made therein, and the invention consists further, in the combination and arrangement of parts and construction of the various details as hereinafter further described, shown in the accompanying drawings, and specifically pointed out in the claims.

In the accompanying drawings Figure 1 is a side elevation of the completed wheel; Fig. 2 is a longitudinal section through one of the spokes, showing a portion of the rim in longitudinal section; Fig. 3 is a similar view showing the tire in transverse section.

In these views 1 is the metal rim carrying the tire T and in which at intervals the socket pieces 2, 2 are riveted or otherwise rigidly secured and in these socket pieces are the transverse socket openings 2', 2'. The hub 4 is provided with corresponding transverse socket openings or slots 3, 3. In these transverse socket openings at the rim side are inserted from one side the transversely extending projections 5', 5' of cylindrical shape upon the heads 5, and at the hub, cylindrical projections 6', 6' upon the heads 6, 6, are inserted from one side into the socket openings 3, 3.

Telescoping tubular spoke sections 9 and 10 are screwed upon or otherwise attached to the heads 5 and 6 respectively. The outer heads 5 are slotted at $5^2$ to permit of inserting from one side the mushroom shaped heads 17' of the wrists 17 upon which are supported the extremities of the springs 13 which are secured thereto preferably by insertion therein as shown in Fig. 2, and at the hub the springs are supported upon similar wrists 18 provided with similar mushroom shaped heads 18' inserted in slot $18^2$ in the enlarged heads $18^3$ of the screw threaded rods $18^4$ which are adjustably secured in the heads 6.

The screw threaded rods $18^4$ are rotatable in the heads 6 to adjust the tension upon the springs and may be turned by means of a tool placed in one of the perforations 16 in the said rod. The wrists 18 are rotatable or swiveled in the screw threaded rods $18^4$ by means of the mushroom heads, so that the spring supports will not turn when the screw rods are turned. The mushroom heads can easily be removed sidewise from the slots to remove the springs when broken.

The springs are under tension when above the hub and are compressed when they arrive in turn below the hub.

Plates 7 and 8 secure the socket pivots in place and the cylindrical projections 5' and 6' can be inserted from the side. A rear wall W for each pivot slot prevents the cylindrical projections 5' and 6' from passing entirely through.

The parts are inclosed to protect them from dust by means of the outer sheath 19 preferably of elastic material, which stretches and collapses to correspond with the elongation or contraction of the spoke.

The sheaths of the several spokes are secured at their outer ends to the rim sockets, in any convenient manner, as by means of the annular enlargement E and a groove G in the socket, and at their inner ends the sheaths are enlarged or expanded to meet closely or overlap so as to protect the hub from dust and are secured by bolts B. Inner annular flange F prevents the entrance of dust at the hub ends of the spokes.

The screw rods to which the inner end of the combined tension and compression springs are attached is preferably hollow at H to provide an exhaust passage for compressed air when the tubes are collapsed.

Having described the invention what I claim as new and desire to secure by Letters Patent is:

1. In a resilient wheel having a rigid hub and rim, telescoping tubes forming spokes therefor, a combined tension and compression spring within each spoke, a head for each end of each spoke, cylindrical projections on each head, said hub and rim provided with transverse cylindrical slots adapted to receive said projections, and plates adapted to cover said openings.

2. In a resilient wheel having a rigid hub and rim, resilient spokes therefor, said spokes comprising telescoping tubes, outer and inner heads for said tubes and sockets in said rim and hub in which said heads are removably secured, coiled springs within said spokes, wrists on which the springs are supported, means for securing said wrists adjustably to said inner heads, said securing means rotatable on the wrists and in said inner heads.

3. In a resilient wheel having a rigid hub and rim, telescoping hollow spokes therefor, socket pieces in said rim, provided with sockets, said hub provided with similar sockets, heads pivoted in said sockets and secured to said telescoping spokes, a coiled spring inclosed in each spoke, a support for each of said springs detachably secured in said heads, said springs being adjustable, elastic sheaths inclosing said tubes, each sheath provided with a thickened outer rim and said socket pieces provided with corresponding molded grooves adapted to receive said thickened rims, and bolts adapted to secure the elastic sheaths to said hub and to each other.

4. In a wheel, having a rim and a hub, telescoping spokes and heads therefor, the said heads pivoted in said rim and hub at their respective ends, a coiled spring in each spoke, attached at one end to one head, a screw threaded rod in the other head to which the other end of the spring is attached, said rod provided with an outlet for compressed air.

5. In a wheel having a hub and rim, resilient spokes therefor, said spokes comprising telescoping tubes, outer and inner heads for the free extremities of said tubes, said heads pivoted in said rim and hub respectively, a coiled longitudinal spring in each spoke, a screw rod in each inner head, a swiveled connection for each spring with said screw rods, each screw rod having a central opening providing communication with the atmosphere.

6. In combination a wheel having a hub and rim, and resilient spokes therefor, each spoke consisting of telescoping tubes and heads therefor, said heads pivoted respectively in the hub and rim of the wheel, a combined tension and compression spring in each spoke, each spoke provided with an opening for permitting the escape of compressed air from the spokes, and an enveloping elastic sheath for each spoke, said sheaths connected together at their inner ends to protect the hub.

7. In a resilient wheel, in combination with the rim and the hub, socket pieces secured to the rim and provided with transverse socket openings, the said hub provided with corresponding socket openings, heads provided with partially cylindrical projections adapted to be laterally inserted in said socket openings, telescoping spokes secured to said heads, screw threaded rods inserted in the heads at the hub end, spring supports on which said rods are swiveled, detachable spring supports in the heads at the rim end, and springs extending longitudinally through said spokes and sleeved over said supports.

8. In a resilient wheel, in combination, a metallic rim, socket pieces secured at intervals in said rim, and provided with transverse tubular slots open on the inner side, said slots serving as sockets and provided with rear walls. outer heads provided with nearly cylindrical projections, insertible in said sockets, a metallic hub, said hub provided with corresponding socket slots, corresponding in number with the sockets in the rim, said sockets also provided with rear walls, inner heads provided with corresponding projections inserted in said sockets in the hub, telescoping tubes secured to said heads, plates detachably secured upon said socket pieces over the open ends of said slots, and an annular plate detachably secured in said hub, over said socket openings therein, internal coiled springs in said telescoping tubes, one in each pair of tubes, outer and inner wrists over which the ends of said springs are secured, the wrists for the outer ends of said springs being detachably secured in said outer heads and adjusting screws in the inner heads to which said inner wrists are rotatably secured.

9. In a vehicle wheel, the combination, with the hub and rim, of tubular spokes therefor, each spoke comprising telescoping portions, a head for each tubular portion, pivotal connections for the heads respectively with the hub, and rim, a coiled spring within each spoke, supports for the ends of the springs detachably secured to said heads, an adjusting screw for one spring support rotatably mounted on said support, said screw passing into one of said tube heads, and an exterior elastic envelop for said tubes, said envelop connecting said hub and rim, substantially as described.

10. In a vehicle wheel having a rim and hub, a series of telescoping spokes in outer and inner tubular sections, a head for each section, a pivotal connection for each head with the rim and hub respectively, a tension spring within each spoke, secured to said tube heads, an elastic sheath for said telescoping tubes and means for securing said sheath at each end to the rim and hub respectively, said sheaths expanded at their hub ends and connected together, and an internal flange in each sheath adapted to engage its respective spoke at the inner end.

In testimony whereof, I hereunto set my hand this 15" day of February 1909.

PAUL WILKES.

In presence of—
Wm. M. Monroe,
Geo. S. Cole.